US011378986B2

(12) United States Patent
Birkedahl et al.

(10) Patent No.: US 11,378,986 B2
(45) Date of Patent: Jul. 5, 2022

(54) SYSTEMS AND METHODS FOR LANDING AND TAKEOFF GUIDANCE

(71) Applicant: Honeywell International Inc., Morris Plains, NJ (US)

(72) Inventors: Byron Birkedahl, Glendale, AZ (US); Marc M. Pos, Duvall, WA (US)

(73) Assignee: Honeywell International Inc., Charlotte, NC (US)

(*) Notice: Subject to any disclaimer, the term of this patent is extended or adjusted under 35 U.S.C. 154(b) by 452 days.

(21) Appl. No.: 16/371,757

(22) Filed: Apr. 1, 2019

(65) Prior Publication Data
US 2020/0310467 A1  Oct. 1, 2020

(51) Int. Cl.
*G05D 1/10* (2006.01)
*G01S 13/935* (2020.01)
(Continued)

(52) U.S. Cl.
CPC ............. *G05D 1/102* (2013.01); *B64C 29/00* (2013.01); *G01S 13/86* (2013.01); *G01S 13/913* (2013.01); *G01S 13/935* (2020.01); *G01S 13/953* (2013.01)

(58) Field of Classification Search
CPC ....... B64C 29/00; G01S 13/86; G01S 13/913; G01S 13/953; G01S 13/60; G01S 13/874; G01S 13/933; G01S 13/935; G01S 7/411; G05D 1/102; G05D 1/0676; G08G 5/0021; G08G 5/0065; G08G 5/025
See application file for complete search history.

(56) References Cited

U.S. PATENT DOCUMENTS 4,152,933 A * 5/1979 Woodhouse ......... G05D 1/0615
73/170.07
4,155,086 A * 5/1979 Blair ................... G01S 13/9029
342/25 A
(Continued)

FOREIGN PATENT DOCUMENTS

KR  20130122715 A    11/2013
WO  WO-9743665 A1 *  11/1997  ........... F41G 7/2226
WO  2018035835 A1     3/2018

OTHER PUBLICATIONS

European Patent Office, "Extended European Search Report from EP Application No. 20166037.0", from Foreign Counterpart to U.S. Appl. No. 16/371,757, filed Jul. 2, 2020, pp. 1 through 11, Published: EP.

(Continued)

*Primary Examiner* — Hunter B Lonsberry
*Assistant Examiner* — Daniel L Greene
(74) *Attorney, Agent, or Firm* — Fogg & Powers LLC

(57) ABSTRACT

Techniques for allowing a vehicle equipped with at least one radar to take-off and land using radar return images of a landing site. The at least one radar generates radar return image(s) of the landing site, specifically of reflective symbols attached to the landing site, allowing the vehicle to orient itself to the landing site and providing information specific to the landing site. Position and velocity in relation to a landing site can be determined using at least one radar and a guidance and landing system. Using the position and velocity information, the guidance and landing system can guide the vehicle to and from the landing site and/or determine whether an obstacle requires the use of an alternate landing site.

14 Claims, 4 Drawing Sheets

(51) Int. Cl.
*B64C 29/00* (2006.01)
*G01S 13/86* (2006.01)
*G01S 13/91* (2006.01)
*G01S 13/95* (2006.01)

(56) References Cited

U.S. PATENT DOCUMENTS

| | | | |
|---|---|---|---|
| 5,661,486 A | 8/1997 | Faivre et al. | |
| 6,269,309 B1* | 7/2001 | Buckingham | G01W 1/10 |
| | | | 702/3 |
| 8,098,192 B1* | 1/2012 | Wichgers | G01S 13/953 |
| | | | 342/65 |
| 8,633,851 B2 | 1/2014 | Vacanti et al. | |
| 9,354,633 B1* | 5/2016 | McCusker | G01S 13/60 |
| 9,738,401 B1 | 8/2017 | Holt et al. | |
| 9,745,078 B2 | 8/2017 | Srivastav et al. | |
| 10,395,544 B1* | 8/2019 | Harris | B64F 1/007 |
| 2003/0093187 A1* | 5/2003 | Walker | B64D 45/0034 |
| | | | 701/1 |
| 2007/0106473 A1* | 5/2007 | Bodin | G08G 5/0069 |
| | | | 701/301 |
| 2009/0102705 A1* | 4/2009 | Obermeyer | H01Q 1/28 |
| | | | 342/25 F |
| 2010/0268458 A1* | 10/2010 | Becker | G08G 5/0021 |
| | | | 701/532 |
| 2011/0196598 A1* | 8/2011 | Feyereisen | G08G 5/0021 |
| | | | 701/120 |
| 2011/0282578 A1* | 11/2011 | Miksa | G06F 16/29 |
| | | | 701/532 |
| 2014/0222246 A1 | 8/2014 | Mohamadi | |
| 2015/0323932 A1 | 11/2015 | Paduano et al. | |
| 2017/0001732 A1* | 1/2017 | Lim | G01S 17/86 |
| 2017/0102713 A1* | 4/2017 | Lim | G01S 17/86 |
| 2017/0308100 A1 | 10/2017 | Iskrev et al. | |
| 2017/0313439 A1* | 11/2017 | Holt | G05D 1/0676 |
| 2018/0024237 A1 | 1/2018 | Laplace et al. | |
| 2018/0039286 A1* | 2/2018 | Tirpak | B64F 1/00 |
| 2018/0137767 A1 | 5/2018 | Hou et al. | |
| 2018/0180713 A1* | 6/2018 | Cohen | G01S 13/32 |
| 2018/0315271 A1* | 11/2018 | Gharabegian | G07F 9/10 |

OTHER PUBLICATIONS

European Patent Office, "Communication pursuant to Article 94(3) from EP Application No. 20166037.0", from Foreign Counterpart to U.S. Appl. No. 16/371,757, dated Mar. 23, 2022, pp. 1 through 5, Published: EP.

* cited by examiner

SYSTEMS AND METHODS FOR LANDING AND TAKEOFF GUIDANCE

BACKGROUND

Emerging technology allows for the operation of vehicles (e.g. air taxis, delivery drones) which require a reliable, safe and precise means for landing and takeoff under conditions of loss of the primary position information, such as provided by a global navigation satellite system (GNSS) receiver. However, a GNSS receiver may provide position information with degraded accuracy or be unable to provide any position information at all, e.g. due to GNSS signals being blocked by structures or jamming. For vehicles in the process of landing or takeoff, even a momentary degradation or loss of position information could lead to a collision with the landing site or adjacent obstacles. Vehicles performing a takeoff or landing require extreme navigation accuracy to operate with a landing site in an urban environment.

While the aforementioned problem can occur when a human operates a vehicle, the problem can be more acute for an autonomous vehicle. In some cases, autonomous vehicles lack secondary systems (in addition to a GNSS receiver) for determining their position. Moreover, some autonomous vehicles cannot determine when their GNSS receiver generates inaccurate position data, e.g. due to jamming or multipath of satellite signals arising from obstacles such as buildings. This is especially problematic when a vehicle relies on GNSS during takeoff and landing, as precision is needed to prevent collision with the environment.

Visual aids and passive optical image sensors may be used to determine position of a vehicle when GNSS position information is degraded or unavailable. Optical image sensors allow for accurate identification of objects and structures and can provide insight to the position of the optical image sensor in relation to said objects and structures. However, optical image sensors can be unreliable due to external variables, i.e. weather that impairs optical imaging. Therefore, there is a need for a more robust means to aid vehicle guidance in takeoff and landing that do suffer the impairments of optical image sensors or solely on GNSS.

SUMMARY

A method is provided. The method comprises: emitting, from the vehicle, a radar signal towards a landing site; receiving, at the vehicle, a radar return signal reflected from a reflective symbol at the landing site; determining a guidance vector, a distance, and a relative velocity of the with respect to the landing site using the radar return image of the reflective symbol; and guiding the vehicle to the landing site using the guidance vector, the distance, and the relative velocity.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electric changes may be made.

Embodiments of the present disclosure provide systems and methods that allow a vehicle's radar-based landing and takeoff system—using reflective symbols—to determine the three-dimensional position of the vehicle during takeoff and landing. That is, when a vehicle attempts to land on a particular landing site, it scans the area below the vehicle using radar. When the vehicle is within range of the landing site, the radar will receive radar return signals corresponding to the landing site's reflective symbol. Each radar may be a scanning or non-scanning radar as will be subsequently described.

In some cases, the reflective symbol may include a data symbol which is compared to a database of data symbols, and from a correlation of the data symbol to a data symbol in the database corresponding to the landing site, the vehicle can identify the landing site as a particular landing site. The systems within the vehicle can use information about the particular landing site stored in the database to further assist in landing. As the vehicle approaches the landing site, the vehicle uses radar return signals to determine the vehicle's three-dimensional position in relation to the landing site, and optionally other kinematic information, i.e. the velocity and attitude of the vehicle. Furthermore, from the radar return signals, the vehicle can determine whether there is an obstruction on the landing site, whether from the detection of a foreign object on the landing site or from the obscuring of the data symbol. Using this information, the vehicle can land on the landing site without reliance on, even partially, systems such as a GNSS receiver or inertial measurement unit(s) (IMU(s)) which provide position information. This system and the associated methods can also be used in a similar manner during takeoff. The reflective symbol and the data symbol are comprised of material that reflects radar signals more than material surrounding such symbols so that radar can discriminate the reflective symbols and data symbols from their surrounding areas.

Figure 1A:
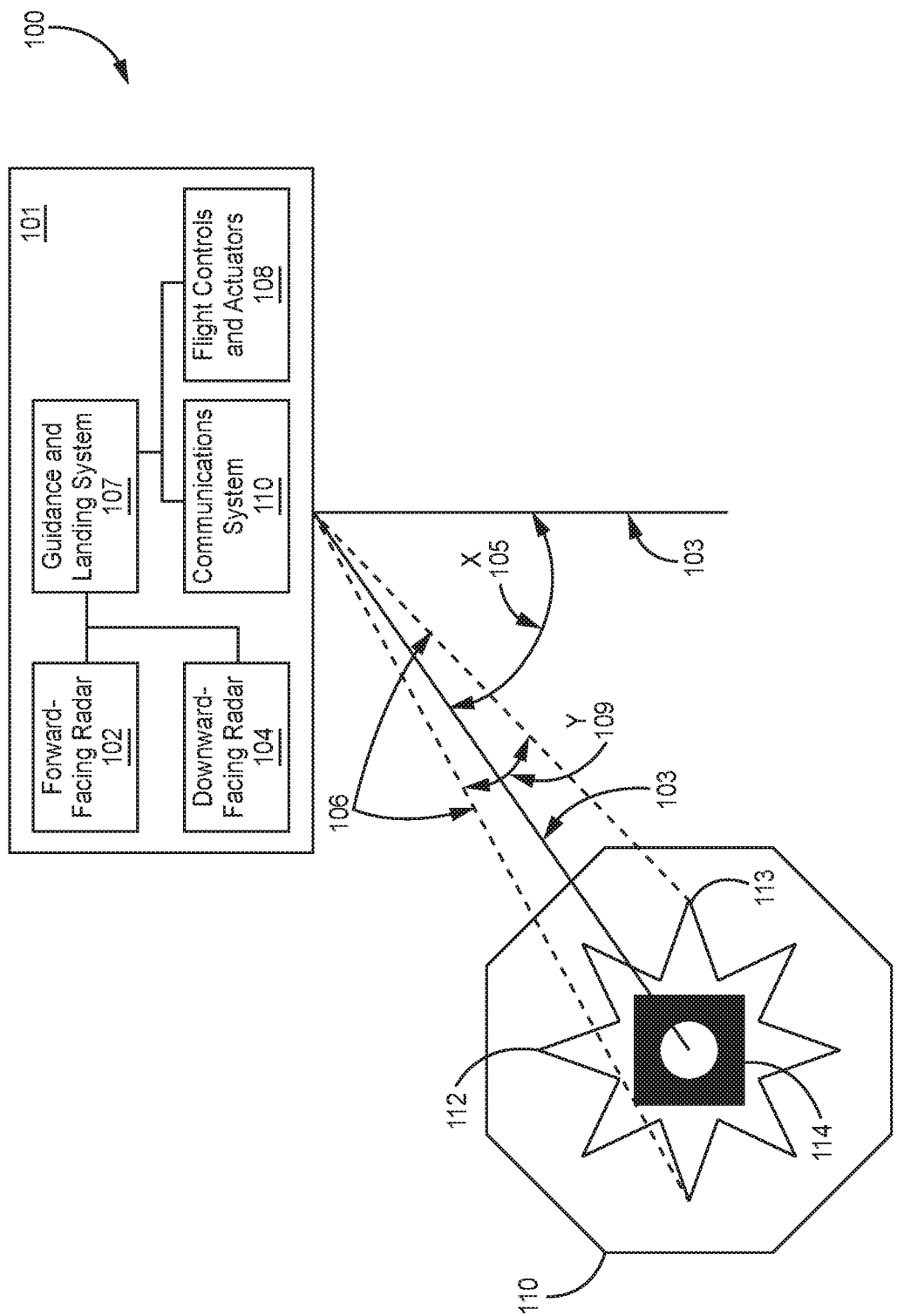
FIG. 1A is a diagram of a vehicle with a guidance and landing system on approach to a landing site according to one embodiment of the invention.

FIG. 1A is a diagram of a vehicle with a guidance and landing system on approach to a landing site according to one embodiment of the invention 100. For pedagogical purposes, the vehicle 101 illustrated herein is an autonomous airborne vertical takeoff and landing vehicle, such as an airborne drone; however, the vehicle 101 may be any other type of vehicle including without limitation a spaceborne or terrestrial vehicle. Such other types of vehicles may be non-airborne vehicles (including drones). The vehicle 101 includes at least one radar, e.g. a forward-facing radar. In such cases, a landing site 110 may be more generally referred to as a departure point or an arrival point. Further, the vehicle 101 may or may be piloted by vehicle operator(s).

Mounted on the vehicle 100 is a forward-facing radar 102, a down-facing radar 104, and in some examples at least one more radar facing in other directions (collectively referred to as "radars"). In some examples, forward-facing radar 102 and the down-facing radar 104 are separate from the vehicle 100. In other examples, the forward-facing radar 102 and the down-facing radar 104 are incorporated in the vehicle 100. reflective symbol 112. However, in other embodiments, a single radar can be employed, e.g. that can be effectively serve as a forward-facing radar and a down-facing radar.

Figure 1B:
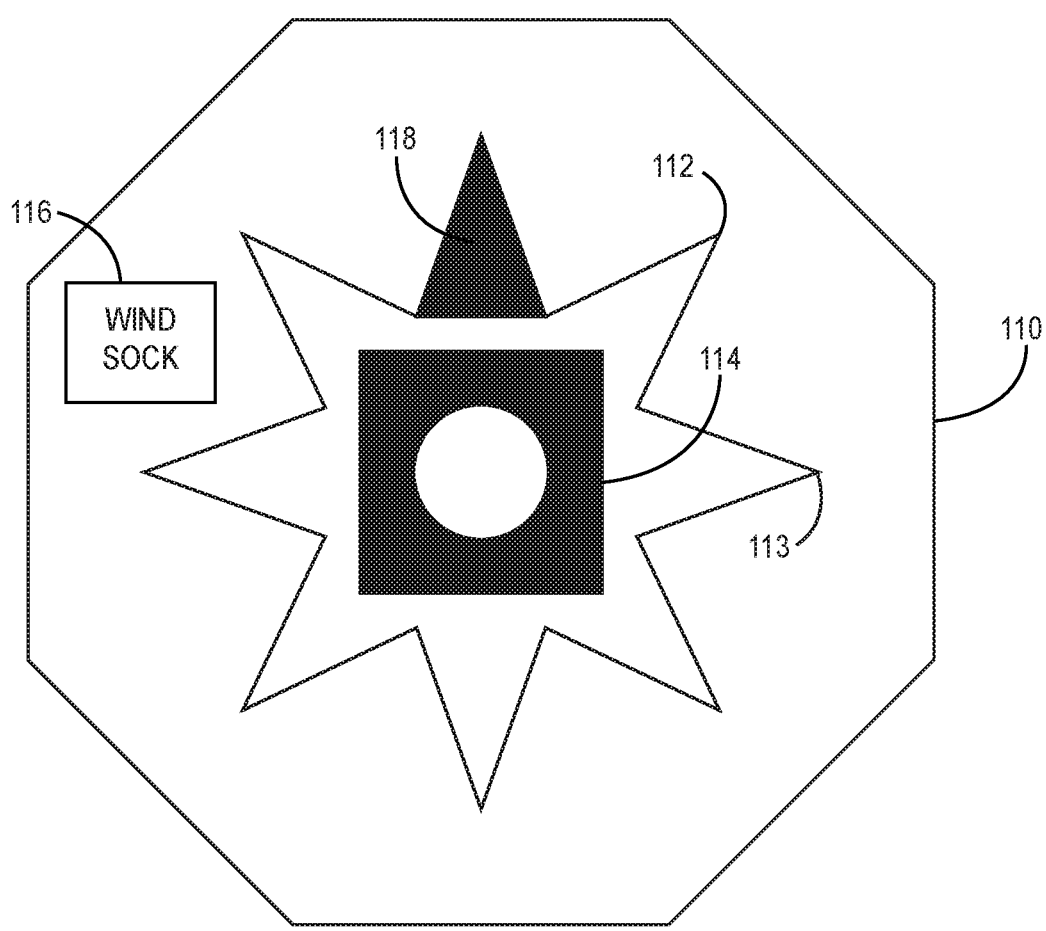
FIG. 1B is a diagram of a landing site according to one embodiment of the invention.

FIG. 1B is a diagram of a landing site 110 according to one embodiment of the invention. The landing site 110 comprises an area, e.g. a surface, on which a vehicle 101 can land. On the landing site 110 is a reflective symbol 112. The reflective symbol 112 is used to orient the vehicle 101 using radar return images of the reflective symbol 112. A radar return image is formed by radar return signals received, e.g. during a period of time, and for all or a portion of a field of regard for the corresponding radar(s). Optionally, the landing site 110 includes a data symbol 114. The data symbol 114 is used to identify the landing site 110 from amongst a collection of landing sites 110 and may correspond to data accessible to the guidance and navigation system 107. Optionally, the reflective symbol 112 and data symbol 114 may or may not be combined into one symbol. The reflective symbol 112 and data symbol 114 may be embedded within the landing site 110 itself. In such embodiments, the reflective symbol 112 and data symbol 114 may comprise corner reflectors of reflective materials, e.g. metallic, and thus while the symbols would not be visible to the eye, they would still be reflective of radar signals such that the symbols could be identified as a reflective symbol 112 and data symbol 114 in radar return images of the landing site 110. In other examples, the reflective symbol 112 and data symbol 114 may comprise a combination of reflective materials on the surface of the landing site 110 and/or embedded in the landing site 110. Embedded materials provide the advantage of being less susceptible to vandalism and degradation.

Returning to FIG. 1A, for pedagogical purposes, two radars will be illustrated: a forward-facing radar 102 and a downward-facing radar 104. However, one, three, or more than three radars may be alternatively used. The forward-facing radar 102 generates information, e.g. about landing sites and obstacles, in front of the vehicle 101. The downward-facing radar 104 generates information, e.g. about landing sites and objects, in below the vehicle 101. Such information can be used by the vehicle 101 for landing and takeoff, e.g. on a landing site in an urban environment. Using reflective materials of the reflective symbol 112 affixed to the landing site, the guidance and landing system 107 can process radar return images from radar(s) to determine the range to the landing zone, and possibly the vehicle's attitude and velocity, and use such information to adjust flight controls and actuators 108 of the vehicle 101 to guide the vehicle 101 whilst taking off from or landing on the landing site 110 while avoiding potential physical obstacles, e.g. another vehicle obstructing the landing area. The guidance and landing system 107 can control the flight controls and actuators 108 to guide the vehicle 101 during travel between landing sites.

However, in some examples one or more radars can be employed in the vehicle 101 facing directions other than forward- or downward-facing. The one or more radars may be collectively referred to as "radars". Multiple radars may be used to increase the field of regard, e.g. up to 360°. Such radars can be mounted on and/or in the vehicle 101. Description of the forward-facing radar 102 and the downward-facing radar 104 applies to all radars employed in the vehicle 101.

The forward-facing radar 102, and downward-facing radar 104 are configured to emit radar signals and to receive return radar signals. The radar signals reflect off objects in the environment. The reflectivity of an object depends on many factors including the shape of the object, the material of the object, and the proximity of different materials. The reflected return radar signals from the radars 102, 104 can be used to determine the position of objects within a field of view based upon the intensity of the return radar signal, direction, and the delay of corresponding return signals. For example, the corner of a building will be more readily identifiable than a flat window pane. Thus, certain features of objects within an urban environment will be more identifiable than others. The landing site 110 contains a reflective symbol 112 which is specially designed to be highly reflective of radar signals.

In the example shown in FIG. 1A, the forward-facing radar 102 is mounted on, e.g. the front of, the vehicle 101 such that the forward-facing radar 102 provides a radar return image of a volume in front of the vehicle 101. The forward-facing radar 102 is configured to emit radar signals in at least one directional beam. In some examples, forward-facing radar 102 is configured to emit at least one radar signal and receive a corresponding reflected radar signal in each of the at least one narrow beams In the example shown in FIG. 1A, the downward-facing radar 104 is mounted on, e.g. the bottom of, the vehicle 101 such that the downward-facing radar 104 provides a radar return image of a volume below the vehicle 101. The downward-facing radar 102 is configured to emit radar signals in at least one directional beam. In some examples, downward-facing radar 104 is configured to emit at least one narrow beam radio signal and receive a corresponding reflected radio signal in each of the at least one narrow beams. For example, a downward directional beam would be scanned, e.g. electronically, across a wide, e.g. a hemispherical, volume in front of the vehicle 101. In the downward directional beam, a downward radar signal is transmitted, and a downward return signal is received if the downward radar signal is reflected from a reflective symbol 112 upon which the downward radar signal impinges. In some examples, the downward-facing radar 104 is configured to emit and receive radio signals in at least one beam. One or more beams are scanned, e.g. electronically, to generate a radar return image, from radar return signals, of a reflective symbol within a volume below the vehicle 101. For example, a downward directional beam would be scanned, e.g. electronically, across a wide, e.g. a hemispherical volume, in front of the vehicle 101. In a downward directional beam, a downward radar signal is transmitted, and a downward radar return signal is received if the downward radar signal is reflected from a reflective symbol 112 upon which the downward radar signal impinges. In some examples, the downward-facing radar 104 is configured to emit radar signals and receive radar return signals, in at least one beam. One or more beams are scanned, e.g. electronically, to image a reflective symbol 112 within a volume below the vehicle 101.

In some examples, each radar is a scanning radar (e.g. a phased-array radar) or a non-scanning radar (e.g. a Synthetic Aperture Radar (SAR) or an Inverse SAR). A phased-array radar may be implemented as described in U.S. Pat. No. 8,633,851 (the '851 Patent), issued Jan. 21, 2014, which is herein incorporated by reference in its entirety. A phased-array radar is suitable for vehicles because it can electronically scan a volume, and thus does not require heavy and bulky mechanical scanning hardware. A phased-array radar that is electronically scanned can almost instantaneously change beam direction unlike mechanically scanned radar. Thus, the electronically scanned phased-array radar facilitate very fast scanning rates—and thus very fast updated radar return images which are beneficial for landing and collision avoidance applications as described herein.

The phased-array radar described in the '851 patent includes multiple radar units, a clock, and a processing system. The radar signal transmitted by each radar units is phased locked to a clock. Each radar unit can subsequently adjust the phase and amplitude of its transmitted radar signal. By doing so, the phased-array radar can be tailored to emit one or more beams and scan the one or more beams. The phased-array radar described in the '851 patent is only one example of how radars in embodiments of the present invention may be implemented.

Optionally, a field of regard may be segregated into more than one region. Each region may be scanned by one or more beams from radar(s). Optionally, monopulse processing can be used to improve radar return image resolution.

Alternatively, in lieu of a scanning radar, a non-scanning radar can be used, such as a SAR or Inverse SAR. A SAR or Inverse SAR system utilizes a single non-scanning radar on a vehicle and the motion of respectively the vehicle or target to produce a detailed image, e.g. of the urban environment. The resulting radar images provide a three-dimensional image of the radar returns through computation. In some examples, the SAR and ISAR radars process the radar return signals and provide the guidance and landing system 107 with a radar return image. In other examples, the radar return signals described herein are provided to the guidance and landing system 107 and the guidance and landing system 107 is configured to process the radar return signals into a radar return image. In one example, the forward-facing radar 102 and/or the downward-facing radar 104 are implemented as non-scanning radar.

In one example, the forward-facing radar 102 and/or the downward-facing radar 104 are implemented as scanning radar, e.g. phased-array radar. In such an example, the forward-facing radar 102 emits one or more beams which scan a region in front of the vehicle 101 to generate a forward radar return image derived from the forward return signal; the downward-facing radar 104 emits one or more beams which scan a region below the vehicle 101 to generate a downward radar return image derived from the forward return signal.

In the examples shown in FIG. 1A, the guidance and landing system 107 is configured to receive radar return signals from the forward-facing radar 102 and the downward-facing radar 104. One or more radar return signals are combined to form a radar return image.

In some examples, the guidance and landing system 107 is configured to send and receive information with other navigation components (e.g. a GNSS receiver, an altimeter, and an attitude and heading reference system (AHRS)). In the example shown in FIG. 1A, the guidance and landing system 107 is configured to determine the position and trajectory of the vehicle 101 in relation to a reflective symbol 112. Furthermore, the guidance and landing system 107 is coupled to vehicle flight controls and actuators 108. The flight controls and actuators 108 include, for example, control surfaces (e.g. rudder(s), elevator(s), and/or aileron(s)), propulsion system(s) e.g. jet(s), rocket(s), and/or propeller(s) systems), and systems for controlling the foregoing. The flight controls and actuators 108 are used to control velocity (speed and direction) and acceleration of the vehicle.

Using the relative position and trajectory of the vehicle 101 to the reflective symbol 112, the guidance and landing system 107 is configured to operate the flight controls and actuators 108 during takeoff from or landing on a landing site 110 by the vehicle 101.

In the example shown in FIG. 1A, the dotted lines 103 represent the tracking of the center of the reflective symbol 112 and directly below the vehicle. The arc angle "x" 105 shows the arc angle between the center of the reflective symbol 112 and directly below the vehicle. The guidance and landing system 107 is configured to orient the vehicle 101 along three axes using an AHRS and can direct the downward-facing radar 104 so that it is orthogonal to the landing site 110, even when the vehicle 101 is not level. In some examples, the downward-facing radar 104 and landing system 107 are configured to track a specific point, e.g. the center of the reflective symbol 112. As the vehicle 101 changes position, the landing system 107 updates the direction of the downward-facing radar 104 so that it continues to point towards the, e.g. center of, the reflective symbol. In some examples, the center of the reflective symbol 112 can be detected by its relation to the rest of the reflective symbol 112, and the downward-facing radar tracks the center of the reflective symbol 112 through successive radar sweeps of the reflective symbol 112. The arc angle "x" is zero, the reflective symbol 112 is directly below the vehicle 101. When the reflective symbol 112 is directly below the vehicle 101, the vehicle 101 can vertically descend onto the reflective symbol 112. In other embodiments, though, the vehicle 101 can descend at an arc angle that is not equal to zero. The guidance and landing system 107 can also use the indication of direction 118 to determine the direction of the vehicle 101 and can change the attitude and heading of the vehicle 101 such that the vehicle 101 lands facing the proper direction, e.g. in the direction of the indication of direction 118. The indication of direction 118 may or may not be visible to the eye. In some examples, the indication of direction 118 is embedded in the landing site 110 and is thus not visible.

In the example shown in FIG. 1A, the dotted lines 106 represent the tracking of the edge 113 of the reflective symbol 112. The arc angle "y" 109 denotes the arc angle between two opposite edges of the reflective symbol 112 in relation to the forward-facing radar 102 or the downward-facing radar 104. The arc angle "y" 109 and the known distance between the radars 102, 104 and the edges of the reflective symbol 112 can be used to determine the distance between the VTOL vehicle 101 and the landing site. The downward-facing radar 104 is configured to determine the distance between it and a physical object. If the determined distance between the downward-facing radar 104 and the reflective symbol 112 differs from the distance between the vehicle 101 and the reflective symbol 112 as determined by arc angle "y" 109, then the vehicle 101 can ascertain that there is an object obscuring or blocking the reflective symbol 112. The landing site 110 may include a reflective symbol 112, a data symbol 114, an indication of direction 118, and in some examples a wind-sock 116.

In the examples shown in FIGS. 1A and 1B, when the guidance and landing system 107 detects a reflective symbol 112, the guidance and landing system 107 is configured to ascertain that the area containing the reflective symbol 112 is a landing site 110. The reflective symbol 112 may or may not be visible to the human eye. In some examples, the reflective symbol 112 comprises a ring around the preferred landing site of the vehicle 101. In some examples, the reflective symbol 112 is a geometric pattern which may or may not be circular and/or symmetric. In some examples, the reflective symbol 112 has a number of reflective features around the perimeter of the reflective symbol 112. In some examples, the reflective features are symmetrical along the perimeter of the reflective symbol 112. For example, a reflective symbol 112 in the shape of an eight-sided shape may have reflective features at each of the eight corners.

Within the reflective symbol 112 can be a data symbol 114. The data symbol 114 may or may not be a part of the reflective symbol 112. The data symbol 114 is a reflective identifier of the landing site 110, e.g. a QR code, a pattern of reflective dots, and/or a unique hieroglyph. Each data symbol 114 may be used to identify the particular landing site 110, such that the data symbol 114 can be used to distinguish one landing site 110 from another landing site 110. In some examples, the data symbol 114 corresponds to a data entry containing further information about the landing site 110 and the reflective symbol 112. This further information may or may not include the dimensions of the landing site 110 and the reflective symbol 112, a schedule for the landing site 110, information regarding nearby alternate landing sites 110, and/or information about the ownership of the landing site 110. In a complex of containing multiple landing sites 110, for example a parking lot, each landing site can be uniquely identifiable so that a vehicle can be assigned to a particular landing spot. For example, multiple landing sites 110 may be present within a small vicinity. Each landing site 110 would have a data symbol 114 such that a guidance and landing system 107 can be instructed to land on a particular landing site 110 with a particular data symbol 114. Furthermore, when the data symbol 114 is unique to the landing site, information about the landing site can be associated to the data symbol 114. In some examples, the data symbol 114 associates to information about the landing site 110, the indication of direction 118, and/or the reflective symbol 112 (e.g. location, owner name, delivery instructions, dimensions of the reflective symbol 112). The data symbol 114 may or may not be visible to the eye. In other examples, the data symbol 114 is embedded in the landing site 110 and is thus not visible.

In the example shown in FIG. 1B, the wind-sock 116 provides the landing system information about the conditions around the landing site 110. In some examples, the wind-sock 116 contains radar reflective material. In some examples, the wind-sock mount, e.g. a pole, also contains radar reflective material. When the wind at the landing site 110 is strong enough, the wind sock 116 changes direction with the wind. Radar imaging of the wind sock can be used to detect wind direction at the landing site 110. Further, the stronger the wind, the higher the wind sock 116 lifts on its the mount. The higher the wind sock 116 lifts, the further it will be from the ground around it, and the closer it will be to the vehicle 101 and its radar(s). Thus, the radar imaging of the windsock can also be used to determine wind strength or speed at the landing site 110. The forward-facing radar 102 and the downward-facing radar 104 are configured to generate radar return images which can be processed, e.g. by the guidance and landing system 107, to detect height above surface and orientation of the wind sock 116, and thus wind speed or strength and direction. With this information, the guidance and landing system 107 compensates for the wind when landing at the landing site 110 using the flight controls and actuators 108.

The indication of direction 118 shown in FIG. 1B can include a general indication of direction, e.g. a cardinal direction. The indication of direction 118 may or may not be integrated into the reflective symbol 112. The indication of direction 118 would be known so a guidance and landing system 107 can use the indication of direction 118 to orient the vehicle as it descends onto the landing site 110.

For pedagogical purposes, when the vehicle 101 approaches a landing site 110, the forward-facing radar 102 and the downward-facing radar 104 scan for a reflective symbol 112. When a radar return indicates a reflective symbol 112, guidance and landing system 107 maneuvers the vehicle such that the downward-facing radar 104 can detect the reflective symbol 112. Using the downward-facing radar 104, the guidance and landing system 107 maneuvers the vehicle 101 such that the vehicle is directly above the reflective symbol 112. The vehicle 101 vertically lands on the landing site 110.

In some examples, the vehicle 101 is configured to land on a landing site 110, using the reflective symbol 112 as a reference. In some examples, the vehicle 101 lands vertically, in other examples the vehicle lands from a non-vertical angle (i.e. from not directly above the landing site 110). The guidance and landing system 107 uses the attitude of vehicle compensate for when vehicle is tilted off axis.

In one example of a landing, when the vehicle 101 approaches a landing site 110 from above. The guidance and landing system 107 tracks the reflective symbol 112 using radars, i.e. the forward-facing radar 102 and the downward-facing radar 104. The vehicle 101 continues horizontally towards the landing site 110 transitioning from use of the forward-facing radar 102 to sole use of the downward-facing radar 104. When the vehicle 101 is positioned directly above the landing site 110, the vehicle 101 descends, using the radar return images of the reflective symbol 112 to determine the range between the vehicle 110 and the landing site. In other embodiments, the guidance and landing system 107 may track the reflective symbol using only the downward facing radar 104.

The vehicle 101 is also configured to takeoff using the reflective symbol 112 as a reference as it does during landings. During takeoff, sensors typically used for navigation, such as a GNSS receiver, may be less accurate to due to interference caused by nearby structures. For example, in an urban environment, multi-path error occurs when GNSS signals reflect off nearby structures reducing the accuracy of GNSS positioning information past allowable tolerances for takeoff and landing. In one example of a takeoff, during takeoff, the guidance and landing system 107 operates in reverse of landing, first using radar return images of the landing symbol 112 to determine the range between the vehicle 101 and the landing site 110. When the vehicle 101 reaches the desired altitude or range from the landing site 110, the radars on the vehicle 101 can be used to determine the three-dimensional position of the vehicle 101 while nearby other structures.

Figure 2:
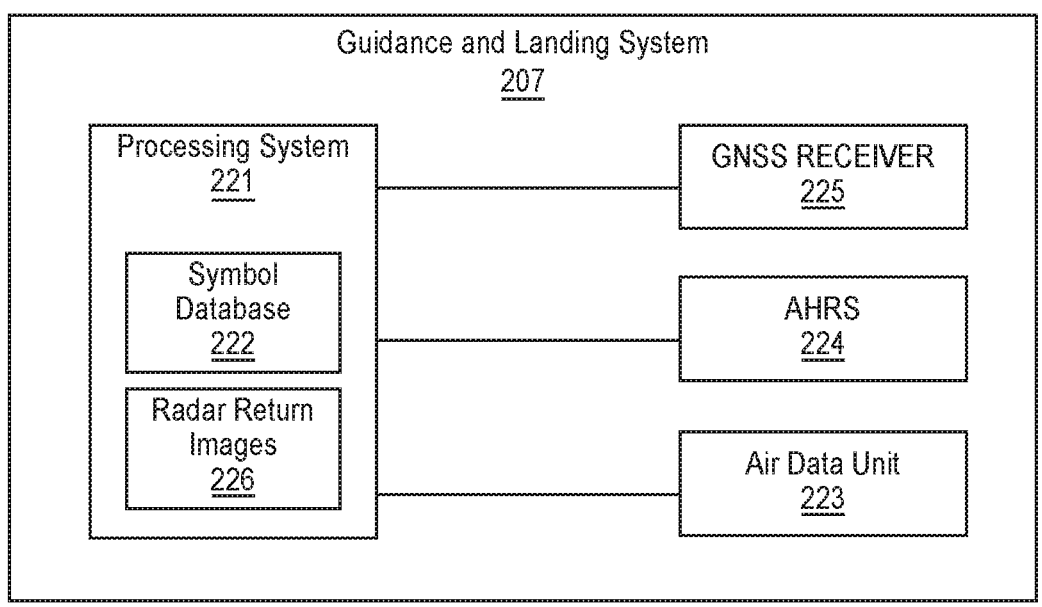
FIG. 2 is a block diagram of an example embodiment of a vehicle equipped with the takeoff and landing system of the present disclosure.

FIG. 2 is a block diagram of one example of a guidance and landing system 207. The description of components with similar names and numbering (i.e. the guidance and landing system 207) applies to the previous iterations of the components, and vice versa.

The guidance and landing system 207 is configured to operate on and/or in the vehicle 101. The guidance and landing system 207 uses radar return image(s) of a landing site to assist with navigation of the vehicle 101. The guidance and landing system 207 includes a processing system 221 including a symbol database 222, and radar return images 226. The processing system 221 is configured to be coupled to radar(s) (e.g. the forward-facing radar 102 and the downward-facing radar 104), and the flight controls and actuators 108.

Optionally, the guidance and landing system 207 includes an air data unit 223, a GNSS receiver 225, and/or an AHRS 224 which are coupled to the processing system 221. The GNSS receiver 225 may be a GPS receiver. The air data unit 223 is configured to provide data to the processing system 223 about the vehicle's altitude above the ground or sea level. The AHRS 224 is configured to provide data to the processing system 223 system about heading and attitude (including roll, pitch, and yaw) of the vehicle 101; such information can be used to determine vehicle three-dimensional position and velocity. An AHRS 224 is typically much less expensive than an inertial navigation system (INS) or an inertial reference system (IRS). Attitude of the vehicle 101 means the orientation of the vehicle 101 with respect to the inertial frame of reference (e.g. with respect to the Earth).

The processing system 221, also known as a processor 221, is configured determine the three-dimensional position, attitude, and/or velocity of the vehicle from the radar return images of the reflective symbol 112, and the AHRS 224. The processing system 221 uses edge detection algorithms to determine the edges 113 of the reflective symbol 112. The processing system 221, referencing symbols stored within the symbol database 222, is configured to recognize the reflection symbol 112 and the data symbol 114. In some examples, the processing system 221 is preprogramed with the dimensions of the reflective symbol 112. In some examples, the processing system 221 determines the dimensions of the reflective symbol 112 through the correlation of the data symbol 114 with the symbol database 222. The AHRS 224 provides the processing system with the attitude of the vehicle 110. Using the attitude of the vehicle 101 to compensate for vehicle off axis tilt, the radar return images of the reflective symbol 112 are used as a reference in three-dimensional space to determine the three-dimensional position and/or velocity of the vehicle 101. By continuously updating the three-dimensional position and/or velocity of the vehicle 101 in reference to the reflective symbol 112, the processing system 221 can guide the vehicle 101 to the associated landing site 110. To do so, the processing system 221 is configured generate control signals. The flight control actuators 108 are configured to be coupled to the processing system 221 and to receive the control signals from the guidance and landing system 107. With knowledge of the vehicle's three-dimensional position, the guidance and landing system 207 can modify the velocity, and thus the future three-dimensional position, of the vehicle 101 to avoid collision(s) with obstacle(s) while landing at a landing site 110.

The symbol database 222 contains information regarding data symbols 114 and reflective symbols 112. For example, the symbol database 222 may contain an index of data symbols 114 with corresponding information about the associated landing site 110, i.e. the location of the landing site 110, ownership information, alternate landing sites, delivery schedules, dimensions of the reflective symbol 112. The processor 221 is configured to access the symbol database 222 and to compare radar return images of data symbols 114 to the symbol database 222 to extract information. In some examples, the symbol database 222 is stored within the processor 221.

When the GNSS receiver 225 is utilized, the vehicle 101 primarily uses the GNSS receiver 225 to determine its three-dimensional position and velocity until the vehicle is within the vicinity of a landing site 110. When the guidance and landing system 207 determines the existence of a reflective symbol 112 of a landing site 110, the guidance and landing system 207 may begin tracking the reflective symbol 112. Optionally, the processing system 221 can determine three-dimensional position and velocity using three-dimensional position data from the GNSS receiver 225 in conjunction with the radar return images of a landing symbol 112. In such an example, the three-dimensional position information may be compared to the position information from the GNSS receiver 225. This may be particularly advantageous when the reflective symbol 112 is obscured by an obstacle. For example, if another vehicle temporarily obscures the reflective symbol 112 from the vehicle 101, the guidance and navigation system 207 continue to rely on the GNSS receiver 225 continuing to the location of the landing site 110, switching back to radar navigation once the temporary obstacle is removed. Furthermore, using data from both the GNSS receiver 225 and the radar return image can be used to generate more accurate relative three-dimensional position and/or velocity data, and/or to identify obstacles partially obscuring the landing site 110. When the GNSS receiver 225 is used in combination with the radar(s), the radar(s) can be focused on the known position of the reflective symbol 112. When the radar return signals indicate that the reflective symbol 112 is not where it should be according to the position information from the GNSS receiver 225, the reflective symbol 112 may be completely obstructed by an obstacle. A combination of GNSS receiver position data and position data using radar return images may be used, e.g. with Kalman filters in and executed by the processing system 221, to more accurately determine three-dimensional position and/or the velocity of the vehicle 101. reflective symbol 112

The processing system 221 comprises processing circuitry coupled to memory circuitry. The processing system 221 may be implemented with analog and/or digital circuitry. For example, the processing circuitry may be implemented with electronic analog circuitry, including circuitry used to implement electronic analog computers. In some examples, the processing system 221 is configured to correlate the output of radar(s) with data of the symbol database 222, the air data unit 223, the AHRS 224, and the GNSS receiver 225. In some examples, the processing system 221 is incorporated into the other components within the guidance and landing system 207.

In the example shown in FIG. 2, the radar return images 226 are stored within the processing system 221. It is understood that the radar return images 226 can be stored within another system within the vehicle and/or within an external system. In some examples, the radar return images 226 are stored in memory circuitry. The radar return images 226 comprise radar return signals from the radars 102, 104 that have been processed to create images of the environment surrounding the vehicle 101.

In the example shown in FIG. 2, the air data unit 223 is configured to be coupled to the processing system 221 and to provide an altitude of the vehicle 101, and optionally a rate of change of the altitude of the vehicle 101. In some examples, the air data unit 223 comprises a baro-altimeter which provides information about the altitude above ground or sea level of the vehicle 101 based the barometric pressure measured by the baro-altimeter. For example, while the air data unit 223 determines that the altitude of the vehicle 101 is above a maximum altitude of all obstacles in a region in which the vehicle 101 is travelling (or above a maximum altitude plus an offset amount), then the guidance and landing system 207 and the processing system 221 need not utilize data from radar(s) 202, 204 in performance of a guidance and landing function. The offset value may be used to account for a margin of error in measurement data from the air data unit 223. Furthermore, if the vehicle does not detect obstacles in its path, e.g. the vehicle is above a maximum altitude of all obstacles, the guidance and landing system 207 can be configured to adjust scanning strategy, e.g. to focus on detecting and avoiding other moving objects or switch to long range scanning and/or mapping.

In the example shown in FIG. 2, AHRS 224 provides information to the other components about the attitude and heading of the vehicle 207. In some examples, the AHRS 224 includes at least one accelerometer, at least one gyroscope, and at least one magnetometer. Each accelerometer measures acceleration along an axis. Each gyroscope measures angular rotation around an axis. Each magnetometer determines direction of an ambient magnetic field. The data from the AHRS 224 may be used to determine that attitude of the vehicle 101, and thus the orientation of radar return images of landing sites 110 Furthermore, the AHRS 224 can be used in conjunction with the indication of direction 118 to determine the horizontal direction of the vehicle in relation to the landing site 110.

When the vehicle 101 is oriented off axis, the radar return image must be corrected with attitude information before being processed. The processing system 221 uses the output of the AHRS 224 to determine the attitude and/or heading of the vehicle 101 with respect to the frame of reference of the landing site 110 represented by the radar return images 226 (e.g. with respect to the reflective symbol 112). When the vehicle 101 is oriented off axis without reference frame correction of radar return images, the processing system 221 cannot accurately determine the three-dimensional position and/or velocity of the vehicle in relation to the reflective symbol 112 because the radar return images 226 could lead to inaccurate determinations of three-dimensional position and/or velocity (relative to the landing site 110) depending on the attitude of the vehicle.

Figure 3:
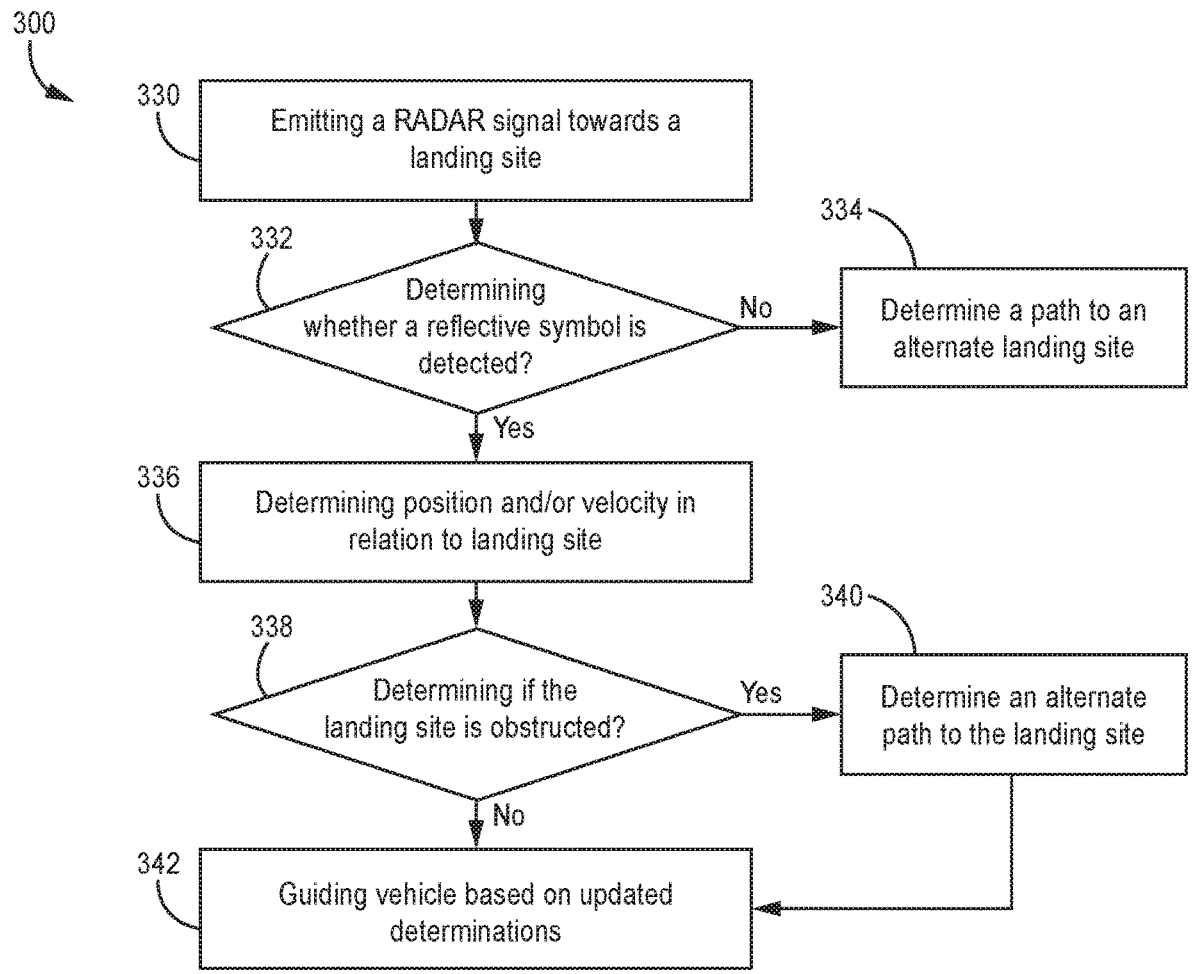
FIG. 3 is a flow chart demonstrating an example embodiment of a method for radar aided landing and takeoff using reflective symbols on a landing site.

FIG. 3 illustrates an exemplary process 300 for performing a vehicle landing using at least one radar. The process 300 is illustrated in FIG. 3 and described herein as comprising discrete elements. Such illustration is for ease of description and it should be recognized that the function performed by these elements may be combined in one or more components, e.g. implemented in software and/or hardware.

To the extent the method 300 shown in FIG. 3 is described herein as being implemented in the devices described above with respect to FIGS. 1A, 1B, and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 330, emit a radar signal towards a landing site. In some examples, the guidance and navigation system constantly scan for reflective symbols proximate to the vehicle. In other examples, when the vehicle is determined to be near a landing site, e.g. as determined by a guidance and landing system using position data from a GNSS receiver, the guidance and navigation system begins scanning for reflective symbols indicating a landing site. The radar(s) may project at least one directional beam from at least one radar on the vehicle towards a region where the landing site, and the reflective symbol, are expected to be located. Each radar periodically emits a radar signal in each directional beam and may receive a radar return signal in the directional beam. Optionally, scan at least a portion of a field of regard (where the landing site and reflective symbol are expected to be) of at least one radar with at least one of the at least one directional beam. For example, a single radar (such as a forward-facing radar) may scan a directional beam using progressive scanning. However, other scanning techniques may be used, such as interlaced scanning of two directional beams emitted by one or more radars. If the directional beam is not scanned, then for example the directional beam may be fixedly pointed, at least for a period of time, at a specific region in the field of regard of the radar which can provide landing site detection in the corresponding field of view and determination of distance from the landing site.

In block 332, determine whether a reflective symbol is detected within reflected return signals. The radar return images are generated from the reflected return signal(s). Because the reflective symbols are designed to be highly reflective of radar signals, the reflective symbols are easily detectable in the radar return image. In one embodiment, the reflective symbol is determined to be within the radar return image by comparison of the radar return image to a symbol database containing the reflective symbol. In other embodiments, the guidance and landing system is trained to seek a reflective symbol at a specific location. If the guidance and landing system seeks a particular landing site and the associated reflective symbol cannot be detected while the vehicle is near the landing site, then the landing site and/or reflective symbol may be obstructed by an obstacle. In some examples, a data symbol—with similar reflective properties to the reflective symbol—accompanies or is included within the reflective symbol. In such examples, the data symbol can be compared to the symbol database to ascertain information about the landing site, e.g. dimensions of the reflective symbol, a landing site designation, and/or landing and/or takeoff instructions. Landing and/or takeoff instructions may include information useful to the vehicle such as speed limits in the immediate area of the landing site and known potential hazards such as power lines. The navigation and guidance system may continue to travel near the landing site, seek an alternate landing site, or abort the landing all together. Generally, if the reflective symbol cannot be detected, the method reverts to block 334. If the reflective symbol can be detected, the method continues to block 336.

In block 334, the vehicle determines a path to an alternate landing site. In some examples, an alternative landing site is available which provides the same services as the original landing site, i.e. allows a product to be delivered to the same individual. For example, the initial landing site may be among a collection of landing sites, when one landing site is obstructed, the vehicle can seek one of the other unobstructed landing sites. In another example, if no other acceptable landing sites are available, the vehicle may be programmed to return to a predetermined landing site to await further instructions. In some examples, the alternate path to the landing site is determined based on information within the symbol database.

In block 336, determine three-dimensional position and/or velocity of the vehicle in relation to the landing site. In each radar return image, a reflective symbol with known dimensions is depicted. The radar return image, the known dimensions of the reflective symbol, and the attitude information of the vehicle can be used to geometrically determine the three-dimensional position of the vehicle. In the examples in which the reflective symbol contains a data symbol, further information about the landing site can inform the determination of three-dimensional position and/or velocity. The data symbol may or may not provide updated information regarding the dimensions of the reflective symbol. In such cases, the updated dimensions of the landing symbol are used to determine the three-dimensional position and/or velocity of the vehicle.

In block 338, determine whether the landing site is obstructed. The guidance and landing system 200 is configured to detect obstructions on the landing site using several different methods. One method for detecting an obstruction is a partial obscuring of the reflective symbol 112. Once the reflective symbol 112 and the corresponding data symbol 114 have been identified, the guidance and landing system 200 can detect when part of the reflective symbol 112 is obscured from view of the radars 102, 104. Another method for detecting an obstruction is doppler returns indicating moving, e.g. spinning, machinery. When an object on the reflective symbol 112 is moving, it causes a doppler effect from the radar signals that reflect from it. The guidance and landing system is configured to recognize these doppler effects, and to perceive them as an obstruction on the reflective symbol 112. Another method for detecting an obstruction is when the timing returns of the radars indicate a solid body is above the symbol. This method might be particularly useful when a person is obstructing the landing site, where the person might not be large enough to obscure the reflective symbol 112, or the person is not dense enough to obscure the reflective symbol 112 from radar. The radar signals when traveling through a solid body, such as that of live matter, can be delayed. If there is determined to be an obstruction to the landing site, the method continues to block 340. If there it is determined that there is not an obstruction, the method continues to block 342.

In block 340, determine an alternate path to the landing site. When the reflective symbol 112 is obstructed, the guidance and landing system 200 is configured to determine an alternate flight path for the vehicle so to avoid collision with the obstruction. In some examples, the alternate flight path is an alternate path of travel to the reflective symbol 112 that avoids the obstruction. When an obstruction is away from the reflective symbol 112, but between the vehicle 100 and the reflective symbol 112, such alternate flight path would be beneficial. In another example, the guidance and landing system 200 may determine that landing at the reflective symbol 112 is impossible, and that an alternate landing site is necessary. In such case, the guidance and landing system would begin again the search for a landing site, using its known position in relation to the known position of another landing site in its determination of a proposed travel, e.g. flight, path. In another example, the guidance and landing system 200 may determine that the obstruction to the reflective symbol 112 may be temporary, and that the vehicle should maintain its position while waiting for the obstruction to be removed from the reflective symbol 112. These alternate flight paths are meant to be examples of options available to the guidance and landing system 200, not an exhaustive list of available options.

If it is determined that an alternate path to the is unavailable, the vehicle may seek another landing site through another iteration of the described method, seeking another landing site. Alternatively, the guidance and landing system may determine that there are no unobstructed landing sites in the area and can instruct the vehicle abort the landing procedures.

In block 342, guide the vehicle based on the relative position, range, and velocity of the vehicle. Using one or more of the radars 102, 104, the guidance and landing system 200 identifies where within the entire field of view of the radar returns that the recognized reflective symbol 112 is present. If a data symbol 114 accompanies the reflective symbol 112, the data symbol 114 detected in the radar return image is referenced to a symbol database 222 to determine whether the landing site 110 is the appropriate landing site. If the landing site 110 is designated for the vehicle, the guidance and landing system 200 begins the physical landing. In some examples, information within the data symbol database alters the protocol for landing and/or takeoff, e.g. providing speed limits when near the landing site. In an alternate embodiment, the reflective symbol 112 is associated to information within the symbol database 222, in which case, the symbol database 222 is referenced to determine whether the landing site 110 is the appropriate landing site. The return of multiple radar signals allows the guidance and landing system to triangulate the position of a specific reflective point. Timing of the returns for the symbol area are used to determine range and range rate of the vehicle to the reflective symbol 112. Using the location of the vehicle in relation to the reflective symbol 112 and the relative motion of the vehicle in relation to the reflective symbol 112, the navigation sensor calculates the forward, lateral, and vertical distance and velocity of the vehicle.

EXAMPLE EMBODIMENTS

Example 1 includes a method of landing and taking off a vehicle, comprising: emitting, from the vehicle, a radar signal towards a landing site; receiving, at the vehicle, a radar return signal reflected from a reflective symbol at the landing site; determining a guidance vector, a distance, and a relative velocity of the with respect to the landing site using the radar return image of the reflective symbol; and guiding the vehicle to the landing site using the guidance vector, the distance, and the relative velocity.

Example 2 includes the method of Example 1, wherein the at least one radar signal is emitted by at least one of a phased array radar, a synthetic aperture radar, and an inverse synthetic aperture radar.

Example 3 includes the method of any of Examples 1-2, further comprising: receiving, at the vehicle, at least one radar signal reflected from a data symbol at the landing site; comparing the data symbol to a symbol database; determining from the symbol database at least one of dimensions of the reflective symbol, a the landing site designation, landing instructions, and takeoff instructions; and wherein guiding the vehicle further comprise guiding the vehicle using at least one of dimensions of the reflective symbol, a landing site designation, landing instructions, and takeoff instructions.

Example 4 includes the method of any of Examples 1-3, wherein the vehicle is a vertical takeoff and landing vehicle.

Example 5 includes the method of any of Examples 1-4, wherein the at least one radar signal comprises at least two radar signals configured to be directed in different directions.

Example 6 includes the method of any of Examples 1-5, further comprising: receiving, at the vehicle, a radar return signal reflected from a wind sock at the landing site;

determining at least one of direction and strength of the wind at the landing site using the at least one radar return signal.

Example 7 includes the method of any of Examples 1-6, further comprising: identifying obstructions on the landing site; determining an alternate landing path to avoid collision with the obstruction; and if an alternate landing path cannot be determined, seeking an alternate landing site.

Example 8 includes the method of any of Examples 1-7, wherein the vehicle is an autonomous vertical takeoff and landing vehicle.

Example 9 includes a system, comprising: a vehicle; at least one radar system affixed to the vehicle, configured to emit a radar signals and receive a radar return signal(s); a landing site with a reflective symbol; a processing circuitry within the vehicle configured to process received radar return signals to generate at least one radar return image, wherein the processing circuitry is configured to determine at least one of a guidance vector, a distance, and a closing velocity of the vehicle with respect to the landing site based upon a correlation of at least one radar return image.

Example 10 includes the system of Example 9, further comprising: a symbol database comprising entries with information regarding at least one of dimensions of the reflective symbol, an identification of the landing site, and landing instructions; and wherein the landing site further comprises a data symbol, wherein the data symbol corresponds to at least one entry in the symbol database.

Example 11 includes the system of any of Examples 9-10, further comprising an attitude and heading reference system (AHRS) comprising at least one accelerometer, at least one gyroscope, and at least one magnetometer.

Example 12 includes the system of any of Examples 9-11, wherein the processing circuitry is further configured, using attitude information from the AHRS, to adjust a frame of reference of the radar return signal(s) in relation to the reflective symbol.

Example 13 includes the system of any of Examples 9-12, wherein the at least one radar system comprises a forward-facing radar system and a downward-facing radar system.

Example 14 includes the system of any of Examples 9-13, wherein the at least one radar system comprises at least one phased array radar configured to emit at least one directional beam, where a radar signal is emitted and a radar return signal may be received in each directional beam.

Example 15 includes the system of any of Examples 9-14, wherein the processing circuitry is further configured to: determine whether the landing site is obstructed; and if the landing site is obstructed, determine an alternate landing path.

Example 16 includes the system of any of Examples 9-15, wherein the vehicle is an autonomous vertical takeoff and landing vehicle.

Example 17 includes a system comprising: a landing site for a vehicle; and a reflective symbol on the landing site, wherein the reflective symbol comprises a radar reflective material in a pattern, the pattern includes a geometric shape of known dimensions.

Example 18 includes the system of Example 17, further comprising a wind sock attached to a mount on the landing site, wherein the windsock is made of radar reflective material.

Example 19 includes the system of any of Examples 17-18, wherein the reflective symbol further comprises an indication of a cardinal direction.

Example 20 includes the system of any of Examples 17-19, further comprising a data symbol comprising a reflective material, wherein the data symbol corresponds to an entry in a symbol database comprising at least one of dimensions of the reflective symbol, an identification of the landing site, and landing instructions.

Although specific embodiments have been illustrated and escribed herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of landing and taking off a vertical takeoff and landing (VTOL) vehicle, the method comprising:
    emitting, from the VTOL vehicle, at least one radar signal towards a landing site;
    receiving, at the VTOL vehicle, at least one radar return signal reflected from a reflective symbol at the landing site;
    determining a guidance vector, a distance, and a velocity of the VTOL vehicle with respect to the landing site using the at least one radar return signal of the reflective symbol;
    guiding the VTOL vehicle to vertically land on or vertically take off from the landing site using the guidance vector, the distance, and the velocity;
    receiving, at the VTOL vehicle, at least one radar return signal reflected from a data symbol at the landing site;
    comparing the at least one radar return signal of the data symbol to a symbol database; and
    from an entry in the symbol database corresponding to the data symbol, obtaining, from the symbol database, at least one of: dimensions of the reflective symbol, landing instructions, and takeoff instructions;
    wherein guiding the VTOL vehicle further comprises guiding the VTOL vehicle using the at least one of: the dimensions of the reflective symbol, the landing instructions, and the takeoff instructions, wherein the takeoff instructions are configured to be used to guide the VTOL vehicle to vertically take off from the landing site, and wherein the landing instructions are configured to be used to guide the VTOL vehicle to vertically land at the landing site.

2. The method of claim 1, wherein the at least one radar signal is emitted by at least one of a phased array radar, a synthetic aperture radar, and an inverse synthetic aperture radar.

3. The method of claim 1, wherein the at least one radar signal comprises at least two radar signals configured to be directed in different directions.

4. The method of claim 1, further comprising:
    receiving, at the VTOL vehicle, a radar return signal reflected from a windsock at the landing site; and
    determining at least one of direction and strength of wind at the landing site using the at least one radar return signal.

5. The method of claim 1, further comprising:
    identifying, using the at least one radar return signal, at least one obstruction on the landing site;
    determining an alternate landing path to avoid collision with the at least one obstruction; and
    if the alternate landing path cannot be determined, then seeking an alternate landing site.

6. A system, comprising:
    at least one radar system, configured to be affixed to a vertical takeoff and landing (VTOL) vehicle and configured to emit radar signals and receive at least one radar return signal from a reflective symbol at a landing site;

processing circuitry configured to be affixed to the VTOL vehicle and configured to process the at least one radar return signal to generate at least one radar return image, wherein the processing circuitry is further configured to determine a guidance vector, a distance, and a velocity of the VTOL vehicle with respect to the landing site based upon the at least one radar return image, and wherein the processing circuitry is further configured to be used to guide the VTOL vehicle to vertically land on or vertically take off from the landing site using the guidance vector, the distance, and the velocity; and wherein the processing circuitry further comprises a symbol database comprising entries wherein each entry corresponds to a data symbol at a specific landing site, wherein each entry comprises information of at least one of: dimensions of the reflective symbol, an identification of the landing site, takeoff instructions, and landing instructions, wherein the takeoff instructions are configured to be used to guide the VTOL vehicle to vertically take off from the landing site, and wherein the landing instructions are configured to be used to guide the VTOL vehicle to vertically land at the landing site;

wherein the processing circuitry is further configured to guide the VTOL vehicle using the at least one of: the dimensions of the reflective symbol, and the takeoff instructions, and the landing instructions.

7. The system of claim 6, further comprising an attitude and heading reference system (AHRS) comprising at least one accelerometer, at least one gyroscope, and at least one magnetometer.

8. The system of claim 7, wherein the processing circuitry is further configured, using attitude information from the AHRS, to adjust a frame of reference of the at least one radar return signal in relation to the reflective symbol.

9. The system of claim 6, wherein the at least one radar system comprises a forward-facing radar system and a downward-facing radar system.

10. The system of claim 6, wherein the at least one radar system comprises at least one phased array radar configured to emit at least one directional beam, where a radar signal is emitted and a radar return signal is received in each directional beam.

11. The system of claim 6, wherein the processing circuitry is further configured to:
    determine, based upon the at least one radar return signal, whether the landing site is obstructed; and
    upon determining that the landing site is obstructed, then determine an alternate landing path.

12. A system comprising:
    a landing site for a vertical takeoff and landing (VTOL) vehicle;
    a reflective symbol on the landing site, wherein the reflective symbol comprises a radar reflective material in a pattern and is configured to be used guide the VTOL vehicle to vertically land on or vertically take off from the landing site; and
    a data symbol on the landing site, wherein the data symbol comprises the radar reflective material and is configured to identify the landing site;
    wherein the data symbol corresponds to an entry in a symbol database comprising at least one of: dimensions of the reflective symbol, takeoff instructions, and landing instructions, wherein the takeoff instructions are configured to be used to guide the VTOL vehicle to vertically take off from the landing site, and wherein the landing instructions are configured to be used to guide the VTOL vehicle to vertically land at the landing site.

13. The system of claim 12, further comprising a windsock attached to a mount on the landing site, wherein the windsock is made of another radar reflective material.

14. The system of claim 12, wherein the reflective symbol further comprises an indication of a cardinal direction.

\* \* \* \* \*